United States Patent
Ennemark et al.

(10) Patent No.: US 9,707,998 B2
(45) Date of Patent: Jul. 18, 2017

(54) METHOD FOR CONTROLLING STEERING OF A VEHICLE

(71) Applicant: Danfoss Power Solutions ApS, Nordborg (DK)

(72) Inventors: Poul Ennemark, Soenderborg (DK); Morten Hoeck Petersen, Soenderborg (DK)

(73) Assignee: Danfoss Power Solutions ApS, Nordborg (DK)

( * ) Notice: Subject to any disclaimer, the term of this patent is extended or adjusted under 35 U.S.C. 154(b) by 0 days.

(21) Appl. No.: 14/749,720

(22) Filed: Jun. 25, 2015

(65) Prior Publication Data
US 2015/0375782 A1 Dec. 31, 2015

(30) Foreign Application Priority Data
Jun. 30, 2014 (DK) .................................. 2014 70402

(51) Int. Cl.
*B62D 7/15* (2006.01)
*B62D 6/00* (2006.01)

(52) U.S. Cl.
CPC ........... *B62D 7/1509* (2013.01); *B62D 6/002* (2013.01)

(58) Field of Classification Search
CPC ....... B62D 7/1509; B62D 7/159; B62D 6/002
See application file for complete search history.

(56) References Cited

U.S. PATENT DOCUMENTS

| 4,315,555 A | * | 2/1982 | Schritt | ................. | B62D 7/1509 180/403 |
| 5,379,220 A | * | 1/1995 | Allen et al. | .......... | B62D 7/1509 180/415 |

(Continued)

FOREIGN PATENT DOCUMENTS

| CA | 2526958 C | * | 7/2013 | | |
| DE | EP 2168905 A2 | * | 3/2010 | ............ | B66F 9/0759 |

(Continued)

OTHER PUBLICATIONS

Mobil Elektronik GmbH, "Intuitive Steering", paper submitted to the EPO in anticipation of oral proceedings and published in the EP Register as part of the file history for EP 1657140 on or about Aug. 10, 2009, 15 pages.*

(Continued)

*Primary Examiner* — Behrang Badii
*Assistant Examiner* — David Testardi
(74) *Attorney, Agent, or Firm* — McCormick, Paulding & Huber LLP

(57) ABSTRACT

A method for controlling steering of a vehicle (1) is provided, the vehicle (1) defining two or more steerable axes, and the vehicle (1) comprising a number of wheels (2), each of said wheels (2) being associated with one of said steerable axes in such a manner that steering of a given wheel (2) is obtained by steering the steerable axis associated therewith. The method comprises providing a first, a second and a third steering input. The first steering input defines a point of intersection between a virtual steering axis (4) and a longitudinal center axis defined by the vehicle (1). The second steering input defines an angle between the virtual steering axis (4) and the longitudinal center axis. The third steering input defines a position of a center of rotation (5) along the virtual steering axis (4). A position for each of the steerable axes defined by the vehicle (1) is calculated, which causes (Continued)

the vehicle (1) to rotate about the center of rotation (5) defined by the first, second and third steering inputs, and each of the steerable axes is moved to the calculated position.

20 Claims, 5 Drawing Sheets

(56) References Cited

U.S. PATENT DOCUMENTS

| | | | | |
|---|---|---|---|---|
| 5,752,578 | A * | 5/1998 | Kellogg | B62D 1/12 180/414 |
| 6,164,406 | A * | 12/2000 | Diekhans et al. | B62D 7/1509 180/327 |
| 2004/0195013 | A1 * | 10/2004 | Spark | B60L 15/2036 180/6.24 |
| 2005/0217906 | A1 * | 10/2005 | Spark | B60T 8/24 180/22 |
| 2006/0261214 | A1 * | 11/2006 | Wallner et al. | B62D 7/1509 244/50 |
| 2008/0290622 | A1 * | 11/2008 | Okada | B62D 1/12 280/99 |
| 2009/0143939 | A1 * | 6/2009 | Rhodes et al. | B62D 12/02 701/41 |
| 2011/0224872 | A1 * | 9/2011 | Reed | B62D 6/002 701/41 |
| 2012/0046835 | A1 * | 2/2012 | Matsumoto et al. | B60L 15/2036 701/41 |
| 2015/0134202 | A1 * | 5/2015 | Dawson et al. | B62D 7/1509 701/41 |
| 2015/0191202 | A1 * | 7/2015 | Otterbein | B62D 7/1509 701/41 |

FOREIGN PATENT DOCUMENTS

| | | | | |
|---|---|---|---|---|
| DE | EP 2253528 | A2 * | 11/2010 | B62D 7/1509 |
| EP | 1657140 | B1 * | 1/2010 | |
| EP | 2168905 | A2 * | 3/2010 | B66F 9/0759 |
| EP | 2253528 | A2 * | 11/2010 | B62D 7/1509 |
| JP | 2004256071 | A * | 9/2004 | |
| JP | 2010247760 | A * | 11/2010 | |
| WO | 93/02906 | A1 | 2/1993 | |
| WO | 02/46856 | A1 | 6/2002 | |
| WO | 03/059720 | A1 | 7/2003 | |
| WO | 2005/101945 | A2 | 11/2005 | |
| WO | WO 2014/122054 | A1 * | 8/2014 | |

OTHER PUBLICATIONS

Jazar, Reza N., Vehicle Dynamics: Theory and Application (Chapter 7: Steering Dynamics), 2008, Springer US, pp. 379-454.*
Jazar, Reza N., Vehicle Dynamics: Theory and Application (Chapter 8: Suspension Mechanisms), 2008, Springer US, pp. 455-517.*
European Search Report for European Application No. EP 15 16 4617 dated Dec. 11, 2015.
Danish Search Report for Danish Application No. PA 2014 70402 dated Jan. 28, 2015.

* cited by examiner

METHOD FOR CONTROLLING STEERING OF A VEHICLE

CROSS REFERENCE TO RELATED APPLICATION

Applicant hereby claims foreign priority benefits under U.S.C. §119 from Danish Patent Application No. PA201470402 filed on Jun. 30, 2014, the contents of which are incorporated by reference herein.

TECHNICAL FIELD

The present invention relates to a method for controlling steering of a vehicle, in particular a vehicle comprising two or more individually steerable axes.

BACKGROUND

A vehicle comprising one steerable axis, e.g. in the form of a steerable axle connected to two wheels of the vehicle, and one fixed axis, e.g. in the form of an axle connected to two other wheels of the vehicle, is normally controlled by the operator of the vehicle steering the steerable axis by means of a steering wheel.

In a vehicle comprising two steerable axes and one fixed axis the steering wheel will normally be used for steering the two steerable axes in accordance with a specific relationship between the two steerable axes. The specific relationship between the two steerable axes is given by the relative position of the three axes of the vehicle.

In a vehicle comprising two steerable axes and no fixed axis, the two steerable axes are also steered by means of a single steering input from a steering wheel. In this case the operator of the vehicle will typically be able to choose between a number of different steering modes, which define how the two steerable axes are to be steered relative to each other. The available steering modes could, e.g., include front steering mode, rear steering mode, centre steering mode and/or dog steering mode.

Thus, in prior art control methods a fixed steering mode must be selected among the available steering modes, and once a fixed steering mode is selected, the steerable axes of the vehicle are controlled by means of a steering input from a steering wheel, according to a mutual relationship which is determined by the selected steering mode.

SUMMARY

It is an object of embodiments of the invention to provide a method for controlling steering of a vehicle, the vehicle defining two or more steerable axes, wherein selection of a fixed steering mode is not required.

It is a further object of embodiments of the invention to provide a method for controlling steering of a vehicle, the vehicle defining two or more steerable axes, the method providing easy control of the vehicle.

The invention provides a method for controlling steering of a vehicle, the vehicle defining two or more steerable axes, and the vehicle comprising a number of wheels, each of said wheels being associated with one of said steerable axes in such a manner that steering of a given wheel is obtained by steering the steerable axis associated therewith, the method comprising the steps of:

provide a first steering input, said first steering input defining a point of intersection between a virtual steering axis and a longitudinal centre axis defined by the vehicle, providing a second steering input, said second steering input defining an angle between the virtual steering axis and the longitudinal centre axis, providing a third steering input, said third steering input defining a position of a centre of rotation along the virtual steering axis, calculating a position for each of the steerable axes defined by the vehicle, which causes the vehicle to rotate about the centre of rotation defined by the first, second and third steering inputs, and moving each of the steerable axes to the calculated position.

The method of the invention is a method for controlling steering of a vehicle. Thereby the method of the invention ensures that steering inputs provided, e.g. by an operator of the vehicle, are used for steering the wheels of the vehicle in such a manner that the vehicle moves in an intended manner.

The vehicle may be any suitable kind of vehicle comprising a number of wheels which are steered by means of two or more steerable axes. The method is, however, particularly suitable for controlling steering of off-road vehicles.

The two or more steerable axes may be in the form of or coinciding with steerable axles, such as steerable axles which interconnect a set of wheels of the vehicle. As an alternative, one or more of the steerable axes may be virtual axes in the sense that each axis represents an axis about which the steering of at least one wheel is performed, but without the presence of a physical axle.

Each of the wheels of the vehicle is associated with one of the steerable axes. Thereby each of the wheels of the vehicle can be steered by steering the steerable axis which the wheel is associated with. A given steerable axis may have only a single wheel associated therewith, or it may have two or more wheels associated therewith. This will be described in further detail below.

The method comprises the steps of providing a first steering input, a second steering input and a third steering input.

The first steering input defines a point of intersection between a virtual steering axis and a longitudinal centre axis defined by the vehicle. The longitudinal centre axis is an axis which extends along a longitudinal direction of the vehicle, e.g. a direction of movement when the vehicle is not turned, i.e. when a steering input device, such as a steering wheel, is in a neutral position. Furthermore, the longitudinal centre axis extends through a centre part of the vehicle, such as centrally with respect to a direction which is transversal with respect to the longitudinal direction defined by the vehicle.

The virtual steering axis is an imaginary axis which is used during control of the steering of the vehicle in a manner which will be described in further detail below.

Since the first steering input defines a point of intersection between the virtual steering axis and the longitudinal centre axis defined by the vehicle, the first steering input defines the position of the virtual steering axis with respect to the vehicle, i.e. whether the virtual steering axis is in front of the vehicle, behind the vehicle or extends through the vehicle.

The second steering input defines an angle between the virtual steering axis and the longitudinal centre axis. Thus, the second steering input defines the inclination of the virtual steering axis with respect to the vehicle. Accordingly, the first steering input and the second steering input in combination define the position and the orientation of the virtual steering axis with respect to the vehicle.

The third steering input defines a position of a centre of rotation along the virtual steering axis. The centre of rotation is a point on the virtual steering axis, and the distance between the vehicle and the centre of rotation defines a radius of curvature of a virtual rotational movement about the centre of rotation. Thus, if this distance is short, a small radius of curvature is defined, and if the distance is long a large radius of curvature is defined.

When the first steering input, the second steering input and the third steering input have been provided, a position for each of the steerable axes defined by the vehicle is calculated. The calculated positions for the steerable axes are calculated in such a manner that positioning the steerable axes in the calculated positions will result in the vehicle rotating about the centre of rotation defined by the first, second and third steering inputs. Thus, if the steerable axes are positioned in the calculated positions, the vehicle will follow the virtual rotational movement defined by the centre of rotation defined by the first, second and third steering inputs.

Finally, each of the steerable axes is moved to the calculated position. Thereby the vehicle is actually caused to rotate about the centre of rotation defined by the first, second and third steering inputs.

It is an advantage that the steering of the vehicle is controlled by providing the three steering inputs defined above, and by calculating the positions of the steerable axes on the basis of the provided inputs, because this allows the steering of the vehicle to be performed without having to select a fixed steering mode. This allows the vehicle to be steered with less constraints than prior art steering methods. Furthermore, using the method, an operator of the vehicle can control the steering of the vehicle in an easy and intuitive manner, and by setting only a few parameters.

The first steering input and/or the second steering input and/or the third steering input may be provided in a stepless manner. According to this embodiment, at least one of the steering inputs is provided in a stepless manner. This allows the steering of the vehicle to be controlled with infinite degrees of freedom, contrary to the prior art methods where a fixed steering mode has to be selected. For instance, the position and orientation of the virtual steering axis with respect to the vehicle, as well as the position of the centre of rotation along the virtual steering axis may be selected freely in order to match a desired movement of the vehicle. Thereby it is possible for the operator of the vehicle to easily make the vehicle move in any desired way.

The first steering input and the second steering input may be provided simultaneously. According to this embodiment, the first and second steering inputs, i.e. the position and the orientation of the virtual steering axis with respect to the vehicle, are provided in one go, possibly by means of a single input device. The operator of the vehicle may even experience it as providing a single steering input.

The step of providing a third steering input may be performed continuously and dynamically. According to this embodiment, the third steering input, i.e. the steering input which defines the position of the centre of rotation along the virtual steering axis, is repeatedly updated or changed during operation of the vehicle. This may be in order to dynamically adapt the steering of the vehicle, e.g. to local conditions or to steer the vehicle in a desired manner.

According to one embodiment, the first and second steering inputs may be provided and kept constant, at least for a period of time, while the third steering input is provided continuously and dynamically. In this case the first and second steering inputs may be regarded as a selection of a steering mode, while the third steering input may be regarded as the continuous steering of the vehicle, e.g. provided by means of a steering wheel.

At least one of the first steering input, the second steering input and the third steering input may be provided manually by an operator of the vehicle. According to this embodiment, the operator of the vehicle provides, and thereby determines, at least one of the steering inputs. For instance, one or more of the steering inputs, preferably the first and/or the second steering input, may be set via a control panel or a display arranged in the vehicle, e.g. via a handle, push buttons, sliding contacts and/or a touch sensitive screen. Furthermore, one or more of the steering inputs may be provided by means of a steering wheel or another suitable kind of steering device.

Alternatively or additionally, at least one of the first steering input, the second steering input and the third steering input may be provided by a control system. According to this embodiment, at least one of the steering inputs is provided automatically by the steering system, without the intervention of an operator of the vehicle. The steering input(s) provided by the control system may, e.g., be determined on the basis of various measurements, such as GPS measurements, measurements of local conditions, such as landscape variations, conditions of the surface on which the vehicle moves, the speed and/or acceleration of the vehicle, the position of a tool mounted on the vehicle, etc.

As an alternative, the control system may suggest at least one of the steering inputs to an operator of the vehicle. The operator may then decide whether or not to provide the suggested steering input manually.

The step of providing a third steering input may be performed by manipulating a steering device. This may advantageously be performed by an operator of the vehicle. The steering device may, e.g., be in the form of a steering wheel, a joystick, or any other suitable kind of steering device.

The first steering input and/or the second steering input may be determined by the third steering input. According to this embodiment, the third steering input may be continuously provided, e.g. in the form of specifying the position of a centre of rotation defining a desired rotating movement of the vehicle. This may advantageously be performed by means of a steering device, such as a steering wheel. In response thereto, the position and/or orientation of the virtual steering axis relative to the vehicle is/are determined, thereby providing the first and/or second steering inputs.

Alternatively or additionally, the first steering input and/or the second steering input may be determined by a speed of the vehicle. According to this embodiment, the first and/or the second steering input may advantageously be provided automatically by a control system. In this case the control system receives information relating to the speed of the vehicle, and based thereon the control system determines the first and/or the second steering inputs.

The step of moving each of the steerable axes to the calculated position may comprise the steps of:
  obtaining a current position of each of the steerable axes,
  calculating a path for each of the steerable axes from the current position to the calculated position, and
  moving each of the steerable axes along the calculated path.

According to this embodiment, a suitable path is calculated for each of the steerable axes, from a current position to the calculated position, i.e. the position which ensures that the vehicle is actually moved in such a way that it rotates about the centre of rotation. The calculated path may, e.g., be the path which provides the fastest transfer from the current position to the calculated position. As an alternative, the calculated path may, e.g. be the path which provides the most smooth transfer from the current position to the calculated position.

The step of moving each of the steerable axes along the calculated path may be performed by moving all of the steerable axes synchronously. According to this embodiment, the steerable axes, and thereby the positions of the wheels of the vehicle, are moved towards the calculated positions in dependence of each other. Thereby a smooth transfer of the entire vehicle towards the desired positions of all of the steerable axes is obtained.

At least one of the steerable axes may have two or more wheels associated therewith. For instance, when a steerable axis coincides with an axle interconnecting two wheels of the vehicle, this steerable axis will have two wheels associated therewith, and adjusting the position of this steerable axis will affect both of the wheels associated therewith. Accordingly, the wheels associated with a given steerable axis are steered together. This provides a relatively simple steering of the vehicle, because the number of axes to be steered is kept lower than the number of wheels of the vehicle.

As an alternative, at least one of the steerable axes may have only one wheel associated therewith. In this case, a wheel being the only wheel associated with a given steerable axis can be steered individually, i.e. independent of the steering of any of the other wheels of the vehicle. According to one embodiment, each of steerable axes may have only one wheel associated therewith. This allows the vehicle to be steered in any desired manner, since there are no constraints on how the individual wheel can be steered.

The method may further comprise the step of displaying the position and orientation of the virtual steering axis relative to the vehicle to an operator of the vehicle. According to this embodiment, the operator of the vehicle can actually see where and how the virtual steering axis is positioned relative to the vehicle. This makes it easier for the operator to provide the first and/or the second steering input, because he or she can readily see how a change in one of the steering inputs affects the position and/or orientation of the virtual steering axis. Furthermore, an experienced operator may know exactly how to position the virtual steering axis in order to obtain a desired movement of the vehicle.

The method may further comprise the step of displaying the position of the centre of rotation defined by the first, second and third steering inputs to the operator of the vehicle. According to this embodiment, the operator can see the position and orientation of the virtual steering axis, as well as the position of the centre of rotation. This makes it even easier for the operator to provide the steering inputs, including the third steering input.

BRIEF DESCRIPTION OF THE DRAWINGS

The invention will now be described in further detail with reference to the accompanying drawings in which.

DETAILED DESCRIPTION

Figure 1:
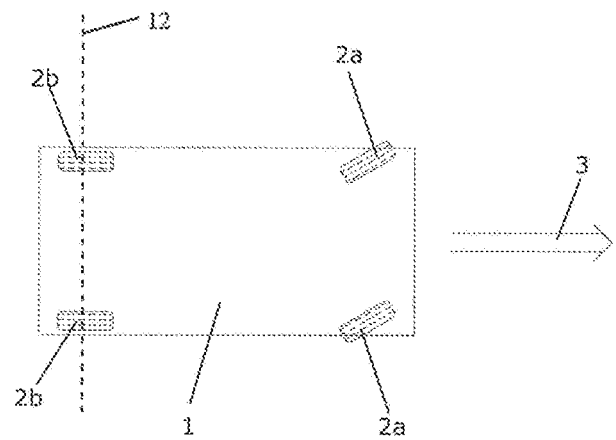
FIGS. 1-4 are schematic illustrations of a vehicle in four different steering modes.

FIGS. 1-4 are schematic illustrations of a vehicle 1 comprising four wheels 2. A forward movement of the vehicle 1 is illustrated by arrow 3. The vehicle 1 defines two steerable axes, each having two of the wheels 2 associated therewith. Thus, the two front wheels 2a, i.e. the wheels arranged closest to the forward direction of the vehicle 1, are associated with one steerable axis 11 and the two rear wheels 2b, i.e. the wheels arranged furthest away from the forward direction of the vehicle 1, are associated with another steerable axis 12.

FIG. 1 shows the vehicle 1 in a front steering mode, where the steerable axis associated with the two front wheels 2a is steered by means of a steering device, such as a steering wheel, while the steerable axis associated with the two rear wheels 2b is fixed. In the position shown in FIG. 1 the vehicle 1 will be turned to the left when moving in a forwards direction.

Figure 2:
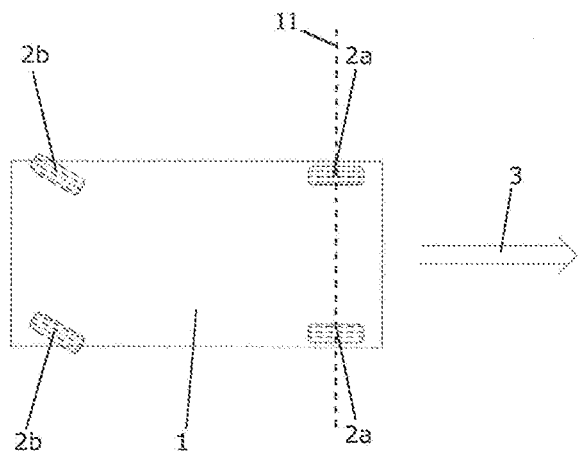

FIG. 2 shows the vehicle 1 in a rear steering mode, where the steerable axis associated with the two rear wheels 2b is steered by means of the a steering device, such as a steering wheel, while the steerable axis associated with the two front wheels 2a is fixed. In the position shown in FIG. 2 the vehicle 1 will be turned to the left when moving in a forwards direction.

Figure 3:
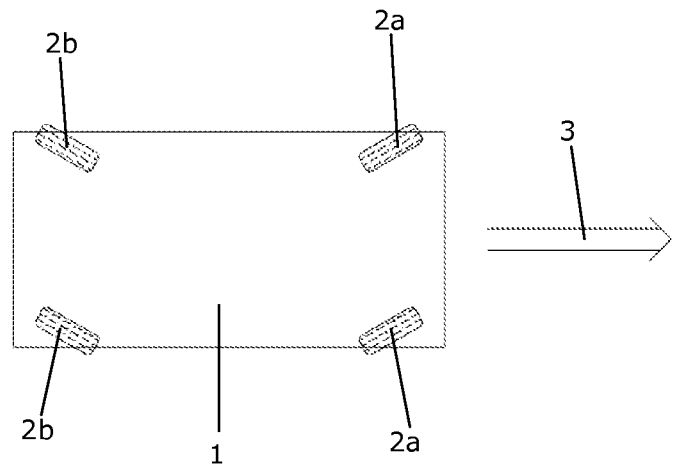

FIG. 3 shows the vehicle 1 in a centre steering mode, where both of the steerable axes are steered by means of a steering device, such as a steering wheel. The steerable axes are interconnected, e.g. hydraulically or mechanically, and are therefore steered in dependence of each other when the steering device is manipulated. This may, e.g., be obtained by having one of the steerable axes connected directly to the steering device, and acting as a master axis, while the other steerable axis is merely connected to the master axis, acting as a slave axis. In the position shown in FIG. 3 the vehicle 1 will be turned to the left when moving in a forwards direction. Since the front wheels 2a as well as the rear wheels 2b are turned, the vehicle 1 will turn sharper than is the case in the situations illustrated in FIGS. 1 and 2. Thus, the vehicle 1 will rotate about a centre of rotation which is closer to the vehicle 1 than the centres of rotation defining the rotating movements of the vehicle 1 in FIGS. 1 and 2.

Figure 4:
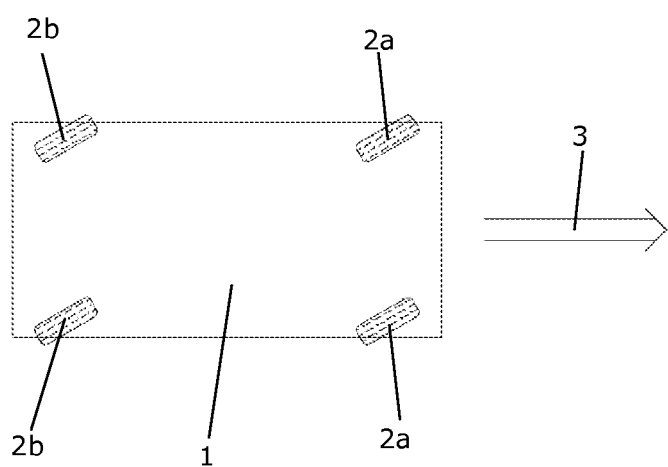

FIG. 4 shows the vehicle 1 in a dog steering mode. Similar to the situation illustrated in FIG. 3, both of the steerable axes are steered by means of a steering device, such as a steering wheel. Furthermore, the steerable axes are interconnected, e.g. hydraulically or mechanically, and are therefore steered in dependence of each other when the steering device is manipulated. However, whereas the steering axes of the vehicle 1 illustrated in FIG. 3 are steered to cooperate in rotating the vehicle 1, the steering axes of the vehicle 1 illustrated in FIG. 4 are steered in parallel. Therefore, in the position shown in FIG. 4 the vehicle 1 will not perform a rotating movement, but will instead move sideways, and the position of the steering device merely determines the speed of the sideways movement of the vehicle 1.

Figure 5:
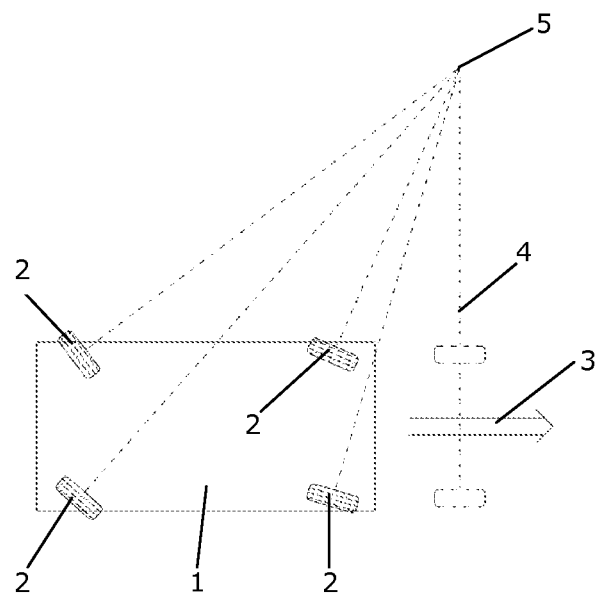
FIGS. 5-7 are schematic illustrations of a vehicle in three different steering modes, applying a method according to an embodiment of the invention.
Figure 6:
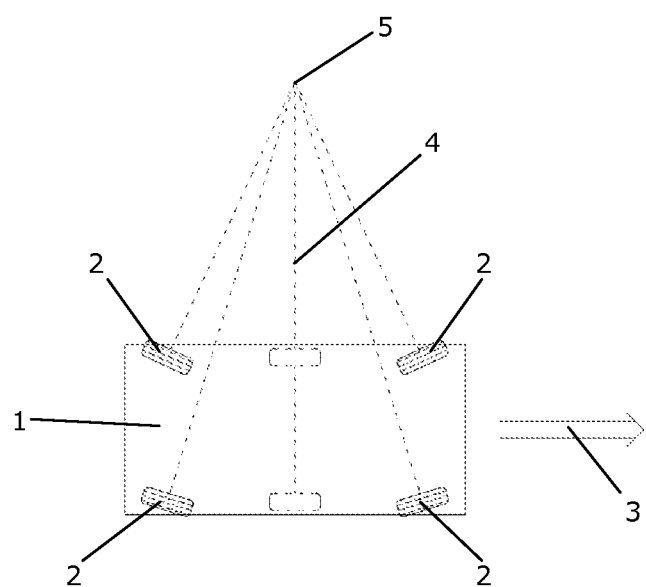
Figure 7:
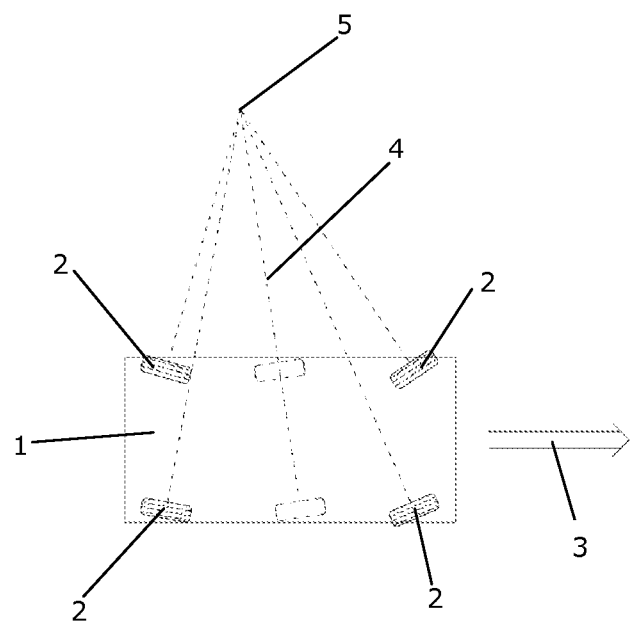

FIGS. 5-7 are schematic illustrations of a vehicle 1 in three different steering modes, applying a method according to an embodiment of the invention. The vehicle 1 comprises four wheels 2, each associated with a steerable axis. Each of the steerable axes has only one wheel 2 associated therewith, the wheels 2 thereby being individually steerable. A forward movement of the vehicle 1 is illustrated by arrow 3.

A virtual steering axis 4 is indicated in each of FIGS. 5-7. In FIG. 5 the virtual steering axis 4 is positioned in front of the vehicle 1, and it extends substantially perpendicularly to a longitudinal centre axis defined by the vehicle 1, parallel to the forward movement 3 of the vehicle 1. In FIG. 6 the virtual steering axis 4 intersects the vehicle 1, and extends substantially perpendicularly to the longitudinal centre axis defined by the vehicle 1. In FIG. 7 the virtual steering axis 4 also intersects the vehicle 1. However, in FIG. 7 the virtual steering axis 4 is inclined relative to the direction perpendicular to the longitudinal centre axis defined by the vehicle 1.

The position and orientation of the virtual steering axis 4, in each of FIGS. 5-7, represents a first steering input and a second steering input, which may have been provided by an operator of the vehicle 1 and/or by a control system.

Furthermore, a centre of rotation 5 along the virtual steering axis 4 is indicated in each of FIGS. 5-7. The centre of rotation 5 is positioned along the virtual steering axis 4 in accordance with a third steering input. The third steering input may advantageously be provided manually by an operator of the vehicle, e.g. by means of a steering device, such as a steering wheel or a joystick.

When the centre of rotation 5 has been positioned along the virtual steering axis 4, a position for each of the steerable axes is calculated. The calculated positions are such that if the steerable axes are moved to the calculated positions, then each of the wheels 2 is arranged in a position which will cause the vehicle 1 to rotate about the centre of rotation 5. Finally, the steerable axes are moved to the calculated positions, and thereby the vehicle 1 is caused to perform a rotating movement about the centre of rotation 5.

In FIGS. 5-7 each of the wheels 2 has been moved into the corresponding calculated position. It can be seen from FIGS. 5-7 that the wheels 2 have been positioned in such a manner that they are arranged perpendicularly to a line extending from the centre of the wheel 2 to the centre of rotation 5. Thereby each wheel 2 is arranged tangentially to a circle having its centre coinciding with the centre of rotation 5.

Controlling the steering of the vehicle 1 in this manner allows the vehicle 1 to be steered in any desired manner, and the steering is not limited to a finite number of fixed and predefined steering modes.

It should be noted that, even though the vehicles 1 of FIGS. 5-7 comprise individually steerable wheels 2, it is within the scope of the present invention that two or more of the wheels 2 could be associated with one steerable axis. For instance, if two of the wheels 2 were associated with one steerable axis, the steerable axis could interconnect the centres of the two wheels 2. In this case the calculated position of the steerable axis could advantageously be a position in which the steerable axis is arranged perpendicularly to a line extending from the middle point of the steerable axis to the centre of rotation 5.

Figure 8:
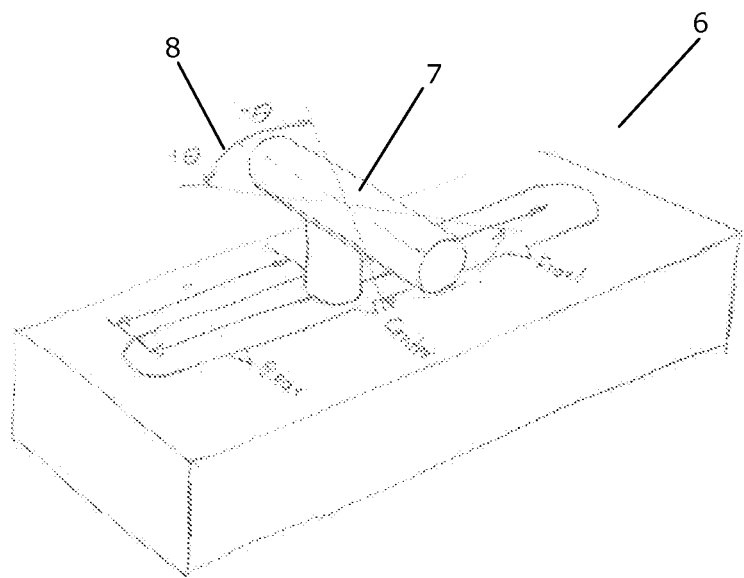
FIG. 8 is a perspective view of a steering input device for providing a first steering input and a second steering input.

FIG. 8 is a perspective view of a steering input device 6 for providing a first steering input and a second steering input for a vehicle. The steering input device 6 comprises a handle 7 being movable between a front position, a centre position and a rear position. The handle 7 may be linearly movable in a stepless manner between the outer extremes, i.e. the front position and the rear position. As an alternative, the handle 7 may be movable in a stepwise manner. The position of the handle 7 along the direction of linear movement determines the position of a virtual steering axis relative to the vehicle. The front position corresponds to the virtual steering axis being arranged in front of the vehicle, e.g. as illustrated in FIG. 5, the rear position corresponds to the virtual steering axis being arranged behind the vehicle, and the centre position corresponds to the virtual steering axis passing through a centre part of the vehicle, e.g. as illustrated in FIGS. 6 and 7. Accordingly, the position of the handle 7 along the direction of linear movement constitutes a first steering input.

The handle 7 is furthermore rotatable, as illustrated by arrow 8. The angular position of the handle 7 determines an inclination of the virtual steering axis relative to the vehicle, or an angle between the virtual steering axis and a longitudinal centre axis defined by the vehicle. When the handle 7 is arranged in a neutral position, as illustrated in FIG. 8, this corresponds to the virtual steering axis being arranged perpendicularly to the longitudinal centre axis defined by the vehicle, e.g. as illustrated in FIGS. 5 and 6. When the handle 7 is rotated in a direction towards $-\theta$, this corresponds to rotating the virtual steering axis towards the rear end of the vehicle, e.g. as illustrated in FIG. 7. Similarly, when the handle 7 is rotated in a direction towards $+\theta$, this corresponds to rotating the virtual steering axis towards the front end of the vehicle. Accordingly, the angular position of the handle 7 constitutes a second steering input.

Figure 9:
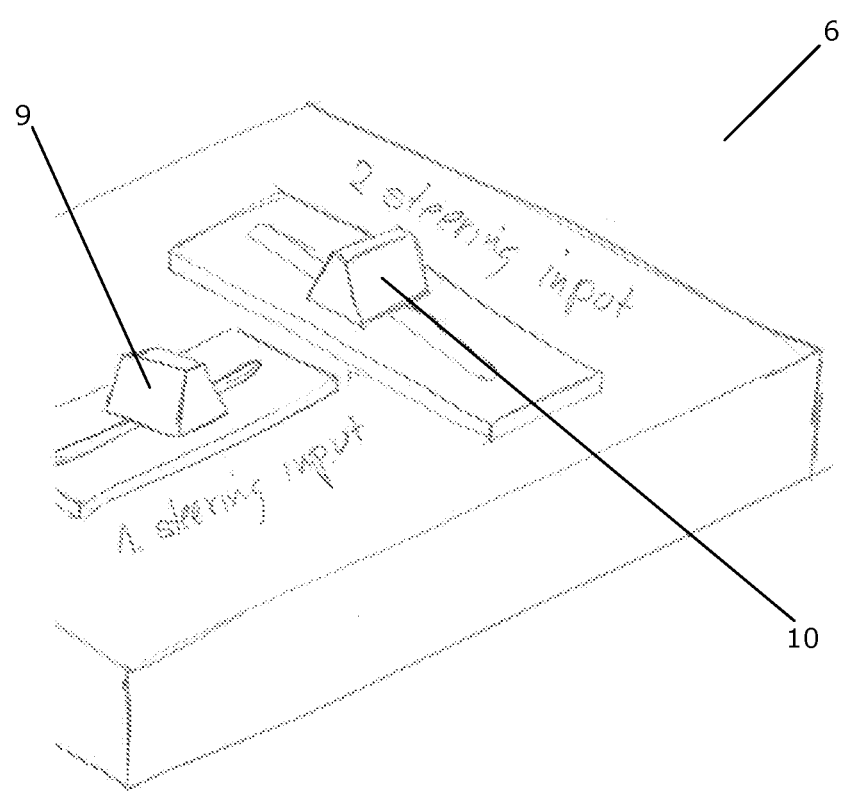
FIG. 9 is a perspective view of an alternative steering input device for providing a first steering input and a second steering input.

FIG. 9 is a perspective view of an alternative steering input device 6 for providing a first steering input and a second steering input for a vehicle. The steering input device 6 comprises a first sliding contact 9 and a second sliding contact 10, each of the sliding contacts 9, 10 being linearly movable, either in a stepless manner or in a stepwise manner. The first sliding contact 9 is for providing a first steering input to the vehicle. Thus, the position of the first sliding contact 9 determines the position of a virtual steering axis relative to the vehicle, similar to the position of the handle illustrated in FIG. 8.

The second sliding contact 10 is for providing a second steering input to the vehicle. Thus, the position of the second sliding contact 10 determines an inclination of the virtual steering axis relative to the vehicle, or an angle between the virtual steering axis and a longitudinal centre axis defined by the vehicle, similar to the rotation of the handle illustrated in FIG. 8.

The sliding contacts 9, 10 are preferably connected to potentiometers which set the steering inputs in accordance with the positions of the sliding contacts 9, 10.

It should be noted that, as an alternative to the sliding contacts 9, 10 shown in FIG. 9, the first and/or the second steering input could be provided by means of a rotating button.

While the present invention has been illustrated and described with respect to a particular embodiment thereof, it should be appreciated by those of ordinary skill in the art that various modifications to this invention may be made without departing from the spirit and scope of the present.

What is claimed is:

1. A method for controlling steering of a vehicle, the vehicle defining two or more steerable axes, and the vehicle comprising a number of wheels, each of said wheels being associated with one of said steerable axes in such a manner that steering of a given wheel is obtained by steering the steerable axis associated therewith, the method comprising the steps of:

provide a first steering input, said first steering input defining a point of intersection between a virtual steering axis and a longitudinal centre axis defined by the vehicle, providing a second steering input, said second steering input defining an angle between the virtual steering axis and the longitudinal centre axis, providing a third steering input, said third steering input defining a position of a centre of rotation along the virtual steering axis, moving each of the steerable axes to a calculated position that is calculated based on the first, second and third steering inputs, which causes the vehicle to rotate about the centre of rotation defined by the first, second and third steering inputs; and displaying the position and orientation of the virtual steering axis relative to the vehicle to an operator of the vehicle.

2. The method according to claim 1, wherein the first steering input and/or the second steering input and/or the third steering input is/are provided in a stepless manner.

3. The method according to claim 2, wherein the first steering input and the second steering input are provided simultaneously.

4. The method according to claim 2, wherein the step of providing a third steering input is performed continuously and dynamically.

5. The method according to claim 2, wherein at least one of the first steering input, the second steering input and the third steering input is provided manually by an operator of the vehicle.

6. The method according to claim 1, wherein the first steering input and the second steering input are provided simultaneously.

7. The method according to claim 6, wherein the step of providing a third steering input is performed continuously and dynamically.

8. The method according to claim 6, wherein at least one of the first steering input, the second steering input and the third steering input is provided manually by an operator of the vehicle.

9. The method according to claim 1, wherein the step of providing a third steering input is performed continuously and dynamically.

10. The method according to claim 9, wherein at least one of the first steering input, the second steering input and the third steering input is provided manually by an operator of the vehicle.

11. The method according to claim 1, wherein at least one of the first steering input, the second steering input and the third steering input is provided manually by an operator of the vehicle.

12. The method according to claim 1, wherein at least one of the first steering input, the second steering input and the third steering input is provided by a control system.

13. The method according to claim 1, wherein the step of providing a third steering input is performed by manipulating a steering device.

14. The method according to claim 1, wherein the first steering input and/or the second steering input is/are determined based on the third steering input.

15. The method according to claim 1, wherein the first steering input and/or the second steering input is/are determined based on a speed of the vehicle.

16. The method according to claim 1, wherein the step of moving each of the steerable axes to the calculated position comprises the steps of:
obtaining a current position of each of the steerable axes,
calculating a path for each of the steerable axes from the current position to the calculated position, and
moving each of the steerable axes along the calculated path.

17. The method according to claim 16, wherein the step of moving each of the steerable axes along the calculated path is performed by moving all of the steerable axes synchronously.

18. The method according to claim 1, wherein at least one of the steerable axes has two or more wheels associated therewith.

19. The method according to claim 1, further comprising the step of displaying the position of the centre of rotation defined by the first, second and third steering inputs to the operator of the vehicle.

20. A method for controlling steering of a vehicle, the vehicle defining two or more steerable axes, and the vehicle comprising a number of wheels, each of said wheels being associated with one of said steerable axes in such a manner that steering of a given wheel is obtained by steering the steerable axis associated therewith, the method comprising the steps of:

providing a first steering input;
providing a second steering input;
providing a third steering input, said third steering input defining a position of a centre of rotation;
calculating a position for each of the steerable axes defined by the vehicle, which causes the vehicle to rotate about the centre of rotation defined by the first, second and third steering inputs; and
moving each of the steerable axes to the calculated position;
wherein, the first steering input defines a point of intersection between a virtual steering axis and a longitudinal centre axis defined by the vehicle, and the second steering input defines an angle between the virtual steering axis and the longitudinal centre axis, the first steering input and the second steering input thereby in combination defining the position and the orientation of the virtual steering axis with respect to the vehicle;
wherein, the third steering input defines a position of the centre of rotation along the virtual steering axis; and
wherein the method further comprises the step of displaying the position and orientation of the virtual steering axis relative to the vehicle to an operator of the vehicle.

* * * * *

UNITED STATES PATENT AND TRADEMARK OFFICE
CERTIFICATE OF CORRECTION

PATENT NO. : 9,707,998 B2  
APPLICATION NO. : 14/749720  
DATED : July 18, 2017  
INVENTOR(S) : Poul Ennemark et al.

Page 1 of 1

It is certified that error appears in the above-identified patent and that said Letters Patent is hereby corrected as shown below:

On the Title Page

Within the References Cited item (56), under Foreign Patent Documents, please amend the references as follows:

EP 2168905 A2 * 3/2010  
EP 2253528 A2 * 11/2010

Signed and Sealed this  
Twenty-fourth Day of October, 2017

Joseph Matal  
*Performing the Functions and Duties of the*  
*Under Secretary of Commerce for Intellectual Property and*  
*Director of the United States Patent and Trademark Office*